June 22, 1937.  R. H. LAWSON ET AL  2,084,914
RIB FABRIC, METHOD OF AND MECHANISM FOR KNITTING THE SAME
Filed Feb. 3, 1932  4 Sheets-Sheet 1
FIG. 2.
FIG. 1.
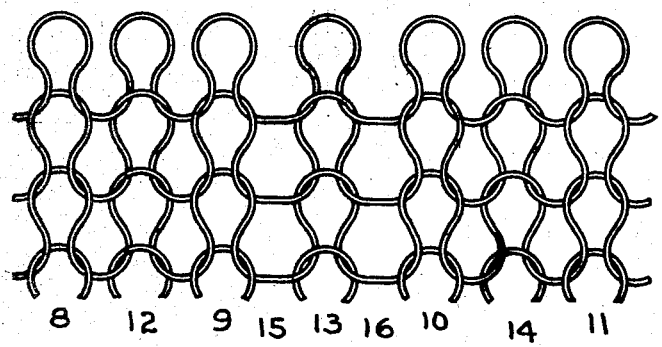
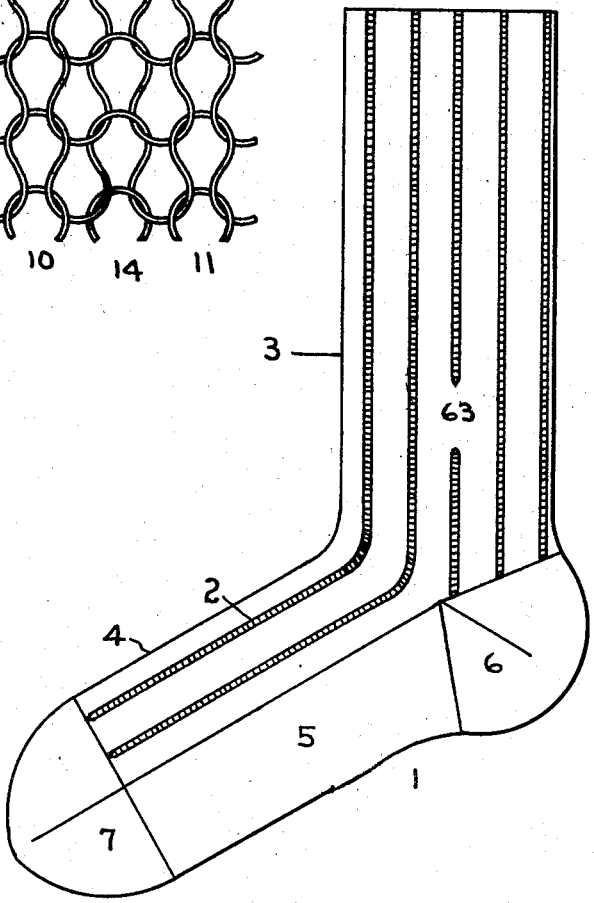
FIG. 1a.
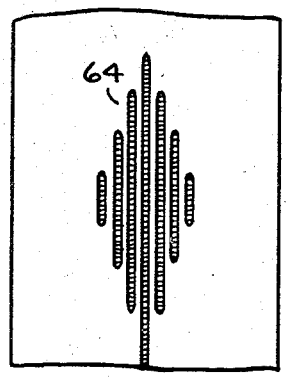
FIG. 3.
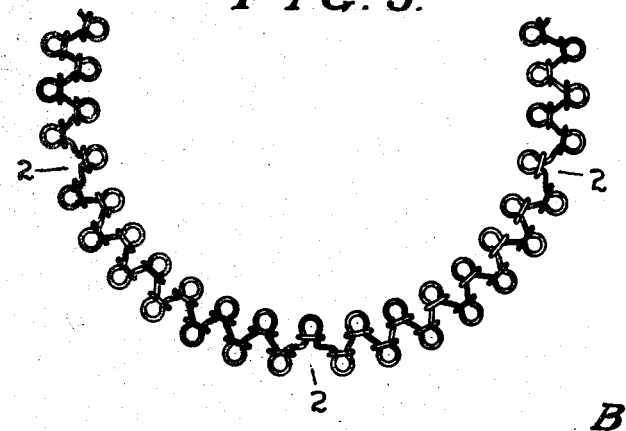
INVENTORS:
ROBERT H. LAWSON,
WILLIAM L. SMITH JR.,
BY Roy F. Lovell,
ATT'Y.

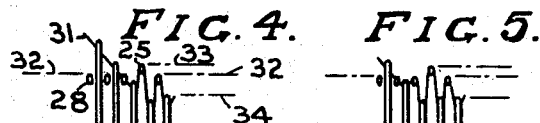
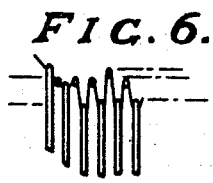
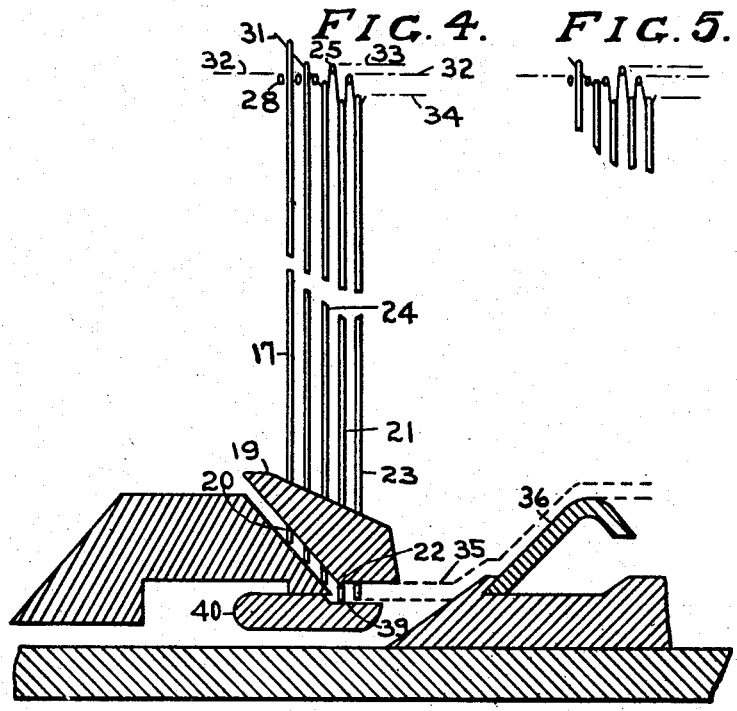
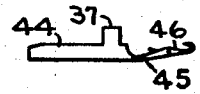
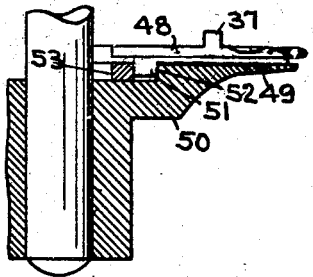
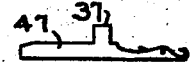
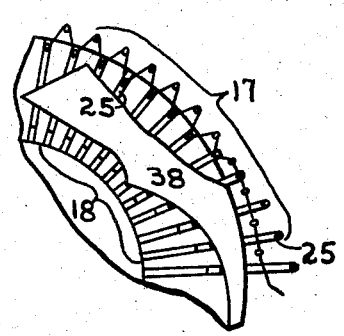
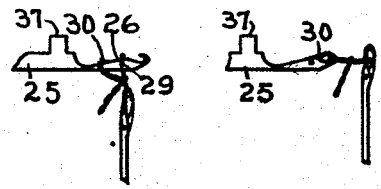

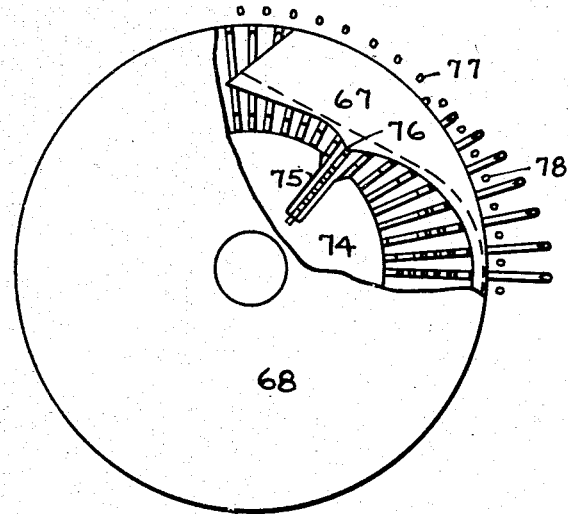
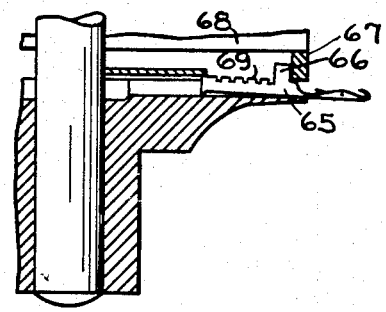
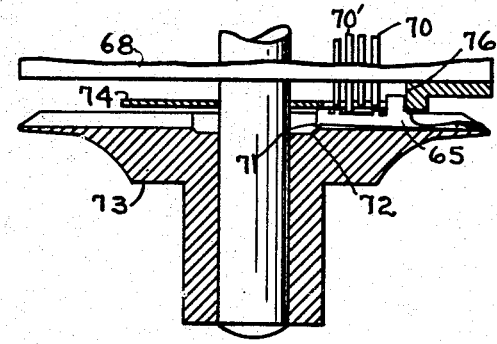
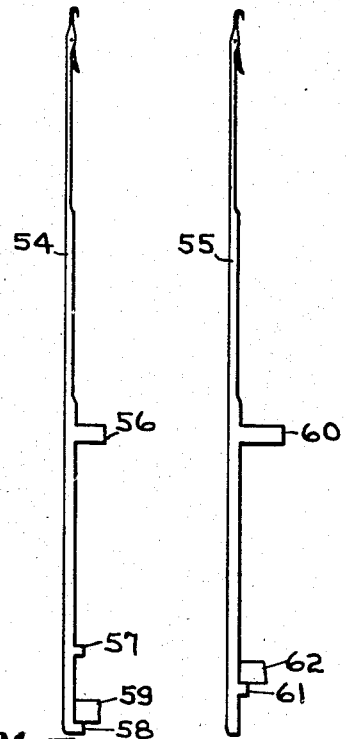
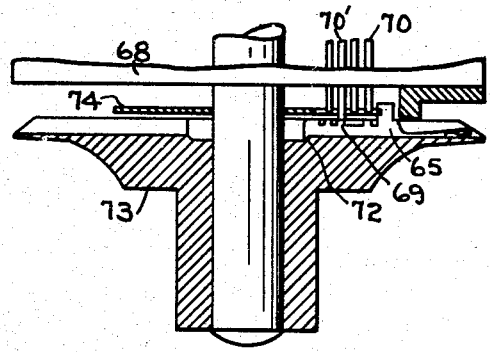
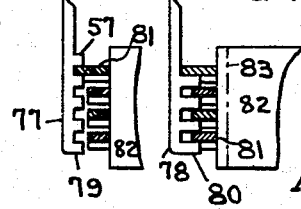
INVENTORS:
ROBERT H. LAWSON,
WILLIAM L. SMITH JR.,
By Roy F. Lovell
ATT'Y.

June 22, 1937. R. H. LAWSON ET AL 2,084,914
RIB FABRIC, METHOD OF AND MECHANISM FOR KNITTING THE SAME
Filed Feb. 3, 1932 4 Sheets-Sheet 4

INVENTORS:
ROBERT H. LAWSON,
WILLIAM L. SMITH, JR.,
BY Roy F. Lovell,
ATT'Y.

Patented June 22, 1937

2,084,914

UNITED STATES PATENT OFFICE 2,084,914

RIB FABRIC, METHOD OF AND MECHANISM FOR KNITTING THE SAME

Robert H. Lawson and William L. Smith, Jr., Pawtucket, R. I., assignors to Hemphill Company, Central Falls, R. I., a corporation of Massachusetts Application February 3, 1932, Serial No. 590,592

8 Claims. (Cl. 66—25)

This invention relates to loose stitch rib fabric as well as to methods of and mechanism for knitting the same.

In the drawings:

Fig. 1 is a diagrammatic view of a stocking having loose stitch wales knitted therein;

Fig. 1a is a view of a fabric showing a loose stitch design;

Fig. 2 is a view showing a few wales and courses of the fabric, the view showing the outer face of the fabric;

Fig. 3 is an edge view of the fabric, the rib and plain wales being laid flat more clearly to show the construction;

Fig. 4 is a fragmentary view partly in section showing cylinder needles drawing stitches over the shanks of interspersed dial needles;

Fig. 5 is a fragmentary view showing dial and cylinder needles at a later phase of the knitting cycle;

Fig. 6 is a view similar to Fig. 5 but showing the dial and cylinder needles at a still later phase of the knitting cycle;

Fig. 7 is a fragmentary plan view showing the dial needles drawing their stitches, some of the dial needles being shown as being retracted to a greater extent than others;

Fig. 8 is a detail view showing a cylinder needle and a dial needle in cooperative relation, the cylinder needle drawing a stitch over the dial needle adjacent to the pivot of the latch;

Fig. 9 is a view similar to Fig. 8 but showing the cylinder and dial needles at a later phase of the knitting cycle, the dial needle at this time drawing its stitch while an adjacent cylinder needle is moving upwardly.

Figs. 10 and 11 are views of dial needles which are intended to be used together, the needle shown in Fig. 11 being for the purpose of knitting drop stitches;

Fig. 12 is a detail view of a modified form of dial needle;

Fig. 13 is a detail view showing a still further modified form of dial needle;

Fig. 14 is a view in section through a dial showing a modified construction whereby loose stitches may be knitted, all of the dial needles being of uniform construction;

Figs. 15 and 16 are views showing special forms of cylinder needles that may be used in conjunction with the various forms of special dial needles hereinbefore referred to;

Fig. 17 is a plan view of a modified construction of dial and cap, a portion of the latter being broken away more clearly to show the construction;

Fig. 18 is a sectional view through the dial and cap showing the construction of the dial needle which permits the knitting of clocks or other designs such as the one shown in Fig. 1a;

Figs. 19 and 20 are sectional views through the dial and cap showing the operation of a dial needle such as that shown in Fig. 18;

Figs. 21 and 22 are fragmentary views showing a construction and control of cylinder needles that may be used in conjunction with the dial needles selectively controlled as shown in Figs. 19 and 20;

Figure 23:
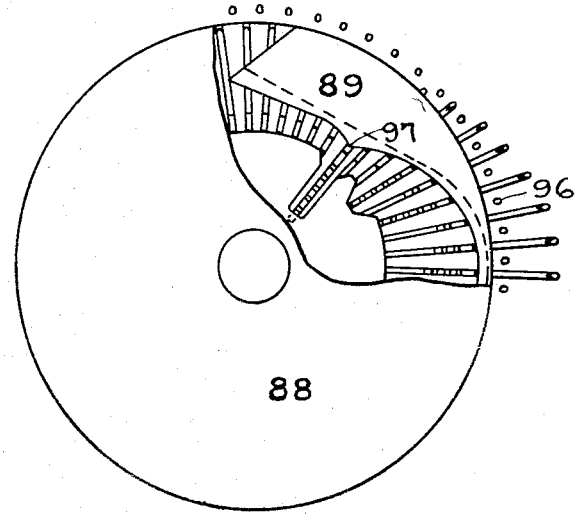
Fig. 23 is a plan view of the needle dial and needles therein, the dial cap being broken away more clearly to show the construction.

The stocking or half hose shown in Fig. 1 and indicated generally by the numeral 1, has a series of loose stitch wales 2 which extend all around the leg 3 of the stocking and into the instep 4 thereof, the sole 5 of the stocking being knitted plain, i. e., without rib stitches and/or loose stitches. A heel 6 and toe 7 may be knitted in any desired manner.

In Figs. 2 and 3 are shown wales and courses of the fabric knitted in accordance with the methods hereinafter to be described. The fabric shown in Fig. 2, has plain wales 8, 9, 10, and 11 and intervening rib wales 12, 13, and 14, and although the rib and plain wales are shown to be in one and one relation, nevertheless any desired proportion and relative arrangement of rib and plain stitches may be adopted. Adjacent to the rib wale 13 and on each side thereof, the thread or yarn appears as relatively elongated floats 15 and 16, the said rib wale in conjunction with the elongated floats 15 and 16 simulating drop stitches.

Referring specifically to Figs. 4-9 inclusive, cylinder needles 17 are shown knitting in conjunction with interspersed dial needles 18 over which latter the cylinder needles draw their stitches. For the purpose of controlling the movements of the cylinder needles 17, a stitch cam 19 is provided which by engaging butts 20 on the said cylinder needles causes the needles successively to move from an upper position to a thread engaging and finally to a stitch drawing position, a needle at the last named position being indicated by the numeral 21. The cam 19 is provided with a point 22 which determines the lowermost stitch drawing position of the cylinder needles, the needles immediately thereafter being permitted to rise slightly as indicated by the needle at the position 23; and at the same time the needle shown at the position 24 moves down to the point 22 of the cam 19 and in so moving robs or draws thread from the needle shown at the position 23 as the latter leaves the point 22 of the cam 19. The following needles act in the same manner, that is, each following needle robs from the immediately preceding needle.

For the purpose of permitting the needles to knit loose stitches, specially constructed dial needles 25 (Figs. 8 and 9) may be used, each such dial needle being so constructed as to provide an edge 26 which is, when assembled in the knitting machine, relatively raised with respect to or at a higher elevation than the yarn drawing edge or surface 27 of the remaining dial needles 28 (Fig. 10) which latter cooperate with the cylinder needles 17 to knit normal length stitches in the usual manner. The edge 26 over which the yarns are drawn by an adjacent cylinder needle 17, is substantially immediately above the pivot 29 of the latch 30, and the yarn drawing edge 27 of each dial needle 28 is similarly positioned. Consequently when adjacent cylinder needles 17 move to the lowermost stitch drawing position shown at 21, Fig. 4, and in Fig. 8, a thread or yarn 31 is drawn over the relatively raised edges 26 of the special needles, thereby causing the cylinder needles 17 that are on each side of the dial needles 25 to draw extra long loops as indicated in Fig. 4. Thus the yarn drawing edges of the dial needles 28 move along a path or elevation indicated at 32, Fig. 4; whereas the yarn drawing edges of the special dial needles 25 move along a relatively elevated path or level 33 to produce relatively loose or drop stitches. The hooks of the cylinder needles after they have drawn their stitches move along the path 34, and the cylinder needle butts 20 moving along the path 35, finally being elevated by means of a cam 36. After the butts of the cylinder needles 17 have been engaged by the cam 36 and raised, the butts 37 of all the dial needles are engaged by a cam 38 and retracted in a manner indicated in Fig. 7. When the butts 20 of the needles reach their lowermost position they engage a surface 39 on a plate 40, which plate is pivoted and spring held in the position shown in Fig. 4.

During the initial phase of stitch drawing, namely, by the cylinder needles, certain of the cylinder needles draw longer stitches than others as just described; and thereafter the dial needles 25 may be caused to retract in such a manner as to draw loose or relatively elongated stitches by robbing from the immediately adjacent cylinder needles which theretofore drew long stitches or loops, but special actuation of the dial needles is not essential.

The needles 28, Fig. 10, which have been described as being used in conjunction with the special dial needles 25, may also be used in conjunction with interspersed drop stitch dial needles 41, Fig. 11. The needles 41 are somewhat shorter than the needles 28 in that the distance from the pivot 42 of the relatively short latches 43 to the bill of the hook of the needle is somewhat shorter than the corresponding distance on the dial needles 28; however, the distance between the point of the latch 43, when the latch is in open position, and the adjacent edge of the butt 37 is substantially the same as the distance between the point of the latch of the needle 28 and the adjacent face or edge of the butt 37. The object in having relatively short hooks on the needles 41, is to cause the hooks of the needles 41 to move deeper in the slots of the dial and consequently draw longer stitches than are drawn by the needles 28, such movement being brought about by engagement of the dial butts 37 by the cam 38.

Another modified form of dial needle is disclosed in Fig. 12, such dial needle being indicated generally by the numeral 44, and being provided with the usual butt 37, the forward portion of the needle being bent upwardly as indicated at 45, such bending causing the hook and latch of the needle as well as the yarn drawing edge 46 to be raised with respect to the corresponding edge 27 of the needle 28, Fig. 10, with which needle the needle 44 is adapted to be used. The bending of the needle 44 as at 45, causes the hook of the needle to be brought somewhat nearer the butt 37 than are the hooks of the needles 28, and consequently when the cam 38 engages the butts 37 on the needles 44, the hooks of the special needles 44 are moved farther radially inward, i. e., toward the axis of the needle cylinder than are the hooks of the needles 28, Fig. 10.

Still another modified form of dial needle 47 is shown in Fig. 13, such dial needle 47 being similar in form to the dial needle shown in Figs. 8 and 9 but differing in some respects, namely, that whereas in Figs. 8 and 9 the hook of the dial needle is somewhat raised with respect to the dial groove within which it slides, the back of the hook of the needle 47 is substantially flush with the edge of the needle which rests in the dial slot; and furthermore, the shank of the needle 47 between the butt 37 and latch pivot has a greater width transversely of the shank of the needle as compared with the width of the needle 25 between the butt and latch pivot.

In Fig. 14 a still further modified form of dial needle 48 is shown, such dial needle being narrower than the needles 28. Where drop stitch effects are desired the dial needles 48 are raised above their companion dial needles by means of jacks 49 which are inserted in the slots of the dial 50 and beneath the dial needles themselves, the jacks 49 being provided with projections 51 which extend downwardly and are received in an annular groove defined by a shoulder 52 in the dial and a ring 53, the butts or projections 51 being retained against movement between the shoulder 52 and the ring 53. Where loose stitches are not desired, the jacks or blanks 49 are not positioned beneath the dial needles 48, the result being that companion cylinder needles as they draw their stitches, draw normal length stitches over the last named dial needles, and draw longer stitches over the dial needles 48 that are elevated by jacks or blanks 49 being placed beneath them.

It is to be understood that the interspersing of special dial needles among regular dial needles does not of itself cause the special dial needles to knit loose or imitation drop stitches; but the loose stitches are initially drawn or measured by cylinder needles which cylinder needles may be specially constructed and/or controlled as are the needles 54, 55 shown in Figs. 15 and 16 respectively. The needle 54 is shown as being one of the short butt needles which knit the heel and toe half or portion of the stocking or half hose, whereas the needle 55 is shown as being one of the long butt needles which knit the instep half or portion. In addition to the usual short butt 56, the needle 54 is shown as being provided with a special butt 57 which is adapted to be engaged by a cam (not shown) during the knitting of the plain sole at which time the short butt needles such as 54, are adapted to be engaged by such cam thereby to draw slightly longer loops than normally for the purpose of accommodating an extra thread in the double sole.

Although not essential, it is sometimes desirable to impart to the cylinder needles on one or both sides of a drop stitch dial needle a longer stitch drawing movement than is imparted to the other cylinder needles, that is, the ones that are to draw the normal length stitches, and for this purpose the needles 54 may be provided with butts 58 adapted to be engaged by a cam 59 which cam is preferably movable radially so as to be withdrawn from the position shown in Fig. 15 during the knitting of the plain sole. Likewise the needle 55 which is provided with the usual long butt 60 also has a butt 61 adapted to be engaged by a cam 62.

It will be understood that the various forms of special dial needles hereinbefore described may be used alone, that is without specially constructed and/or controlled adjacent cylinder needles; and cylinder needles may alone be specially constructed and/or controlled by being given greater stitch drawing movement, the dial needles all being of the same construction and the thread or yarn being drawn by the cylinder needles over such dial needles, the yarn drawing edges of which are at the same height or level.

In Figs. 17–22 inclusive there is shown a still further modified construction by the use of which pattern effects may be knitted such as the breaking of a stripe 2 at 63, Fig. 1, or clock work or other designs, e. g., the design indicated at 64 in Fig. 1a.

The dial needles 65 are specially constructed, all being provided with the usual butt 66 for actuation by cams, such as 67, carried on the underside of the dial cap 68. The dial needle 65 are further provided with a series (four being shown) of frangible butts 69 which butts are adapted to cooperate with a series of cams or plungers 70 which cams are movable vertically in the dial cap 68 whereby to move to and from a position where they are in the path of the advancing and companion dial butts 69. The aforesaid movements of the cams 70 may be selectively controlled in any desired manner. As indicated in Figs. 19 and 20 some of the butts 69 have been removed and as a consequence of such removal the companion, i. e., immediately above, cams 70 do not act upon such butts and consequently whether such cam or cams is or are in a relatively low and butt engaging position does not matter, the removal of the butts obviously preventing a special needle actuation, which will be hereinafter described, by the cam or cams 70. However, when a cam such as the one indicated by the numeral 70', Figs. 19 and 20, is moved to the butt engaging position shown in said figures, the advancing and companion butts 69, Fig. 20, move into engagement with the cam 70' and as a consequence thereof, the needles such as needle 65 are moved from the position shown in Fig. 19 to the relatively depressed or lowered position shown in Fig. 20, the interengagement of the cam 70' and butts 69 as just described, causing a bevelled and downwardly extending projection 71 on the needle to engage a correspondingly bevelled surface 72 provided by recessing the dial 73, the resultant engagement of the bevelled edge on a dial needle by the inclined surface 72 causing the dial needle to be retracted somewhat from the position shown in Fig. 19 to that shown in Fig. 20, thereby drawing a longer dial stitch than would have been drawn had the dial needle not been specially actuated and retracted in the manner just described. A circular plate 74 is provided for retaining the dial needles in a proper position in the needle slots in the dial 73, such plate 74 being provided with a radial slot 75 (Fig. 17), through which radial slot the cams 70 are moved to be brought into the path of the advancing butt 69, such slot 75 being located opposite the point 76 of the cam which retracts the dial needles to normal stitch drawing position.

In conjunction with the specially controlled dial needles 65, specially constructed and controlled cylinder needles 77 and 78 may be utilized. The needle 77 is one of a group of needles adapted to knit the heel and toe portion of the stocking and is provided with a regular butt 56 (Fig. 15) and with a special butt 57 as well as with a series (four being shown) of short, frangible butts 79; the needles such as 78 having long frangible butts 80. Butts 79, 80 are adapted to be engaged by selectively controlled cams such as 81. The cams 81 are selectively controlled in any desired manner so as to be individually and selectively moved to and from a position where they engage their companion butts 79 and 80, the cams 81 for that purpose being slidably mounted in a cam block 82. During the knitting of a plain sole the dial needles are in a withdrawn, inactive position and consequently the short butt cylinder needles 77 are not specially actuated; and with that purpose in view, it is necessary that some provision be made for permitting the selective control of the long butt, instep needles 78 while at the same time maintaining the selectively controlled cams 81 out of contact with the short butts 79. In Figs. 21 and 22 the cam block is shown at its inner or advanced position as it is when the dial needles are knitting all around rib work such as during the knitting of the leg of a stocking; and the dot and dash line 83 (Fig. 22) indicates the second position of the cam block 82 which it assumes during the knitting of part rib and part plain work such as is knitted for the rib instep and plain sole of a stocking. Should it be desired to obtain the same loose stitch design in the front half of the stocking as in the rear half of the stocking, all of the cams 81 including the upper cam are, when active, in the fully advanced position shown by the upper cam 81, but if it be desired to knit a greater variety of pattern effects in the front half of the stocking than in the rear half, some of the cams 81 such as the three lowermost cams are advanced only far enough to engage their companion long butts 80 not being in a sufficiently advanced position to engage and actuate the butts 79. When the cam block is in a withdrawn position indicated by the dot and dash line 83 (Fig. 22) the projection of a cam 81 does not advance the same beyond the position shown by the lowermost cams 81 in Figs. 21 and 22, and as a consequence thereof, the short butt cylinder needles 79 are not specially controlled during the knitting of part rib and part plain fabric such as the ribbed instep and double sole of a stocking or half hose.

It will be understood that the dial needles 65 may be selectively controlled in the manner hereinbefore described without special actuation of the companion cylinder needles; and likewise, the cylinder needles 77, 78 may be specially controlled for the purpose of drawing longer, drop stitches without a corresponding construction and/or actuation of the dial needles 65.

In Figs. 23–28 inclusive, there is shown a still further modified construction of dial and dial needles, whereby ordinarily actuated cylinder needles may cooperate therewith for the purpose of producing loose or imitation drop stitches.

In the said figures, a dial 84 is shown as being provided with an annular recess 85 for a purpose hereinafter to be described. Mounted within tricks or grooves provided in the upper face of the dial 84 are dial needles such as 86 which dial needles are maintained within the slots of the dial 84 by means of a disc or plate 87, and surmounting the dial 84 is a dial cap 88 between which and the dial 84 there are relative rotary movements, the dial preferably rotating and the dial cap being maintained in a fixed circumferential position. Depending from and attached to the underside of the dial cap 88, is a cam 89 similar in construction and function to the cam 67 shown in Fig. 17. The dial needles 86 are each provided with a butt 90 for actuation by the aforesaid cam 89, said needles also being further provided with a series of frangible butts 91, such butts 91 being provided for selective purposes, i. e., to permit the selection of needles 86 in a manner hereinafter to be described. The plate 88 is provided with a series of elongated slots 92 through which downwardly extend a series of plungers or cams 93 similar in construction and operation to the cams 70 shown in Figs. 19 and 20. The plungers or cams 93 correspond in number to the slots 92 and likewise correspond in number to the rows of frangible butts 91. In order to produce the desired pattern it is necessary to break off the butts 91 not desired, one such butt being shown as broken off in Fig. 25 and the corresponding cam or plunger 93' being shown in an active position; but, due to the fact that the companion butt 91 is removed, the corresponding cam or plunger 93', Fig. 25, has no effect on the needle. However, in Fig. 26, the needle 94 is shown as being provided with a full complement of butts and, consequently, the aforesaid depressed cam or plunger 93' engages a companion butt on the said needle 94 thereby causing the butt end of the needle to be depressed within the annular recess or groove 85, the movement of such needle being limited by its downwardly extending projection 95 coming in contact with the upper face of the dial 84 which defines the aforesaid annular recess 85. Movement of the needle 94, Fig. 26, to the position shown, causes the hook end of the needle which projects beyond the verge of the dial 84, to be raised a slight extent, whereupon the companion cylinder needles 96 as they draw their stitches, draw such stitches over relatively raised edges, with the result that longer stitches are drawn by the stitch drawing movements of the adjacent cylinder needles.

Figure 27:
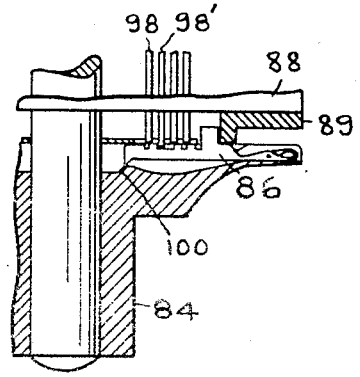
Fig. 27 is a fragmentary sectional view showing the needle shown in Fig. 25 but at a later phase in the knitting cycle.
Figure 28:
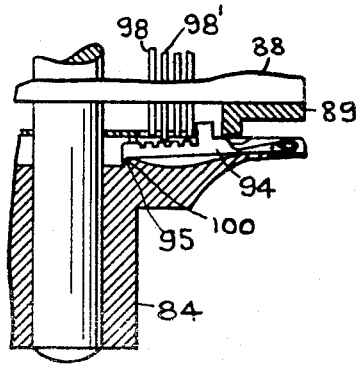
Fig. 28 is a view similar to Fig. 27 but corresponding to Fig. 26.

Continued movement of the needles in an anticlockwise direction brings the needles such as 86 and 94 to the positions shown in Figs. 27 and 28. At this time, the needle 86 has been retracted by the point 97 of the cam 89 to the position shown in Fig. 27, where the downwardly projecting end of the needle rests upon the upper surface of the dial 84 as shown in Fig. 27. The needle 94 when it reaches the position in the knitting cycle indicated in Fig. 28, has one of its frangible butts moved to a position opposite a depressed cam or plunger 98' of a series of cams or plungers 98 which correspond in number and selection to cams 93, each cam 98 being adapted to pass through a hole 99 provided in dial cap 88, whereupon the needle 94 is depressed, its projection 95 engaging an incline or slope 100 which is provided upon the upper surface of the dial 84. As a consequence of the engagement between the projection 95 and inclined surface 100, the dial needle 94 is tilted to the position shown in Fig. 28 and at the same time the needle is moved inwardly or toward the axis of the dial from a position corresponding to that shown in Fig. 27.

Figure 26:
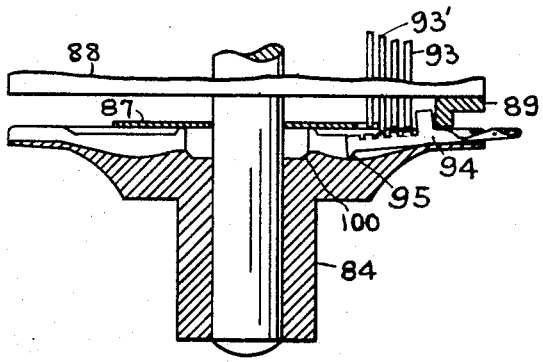
Fig. 26 is a view similar to Fig. 25 but showing a dial needle as having been selected.
Figure 24:
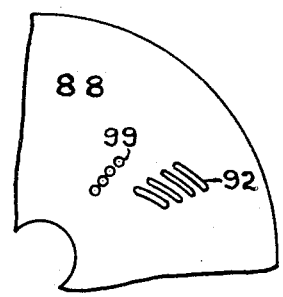
Fig. 24 is a fragmentary view of a portion of the dial cap which is broken away in Fig. 23.

The selective movement of a needle such as the needle 94 to the position shown in Fig. 26, as aforesaid, raises the hook portion of the needle to a higher elevation and thereby permits the companion cylinder needles 96 to draw longer stitches over such dial needles; and immediately thereafter when the dial needle 94 reaches the position in the knitting cycle, indicated in Fig. 28, the active or depressed plunger or cam 98', causes the dial needle 94 to be retracted to the position shown in Fig. 28, as aforesaid, with the result that the initially drawn elongated stitch measured by a companion cylinder needle, is robbed therefrom by the dial needle 94.

Figure 25:
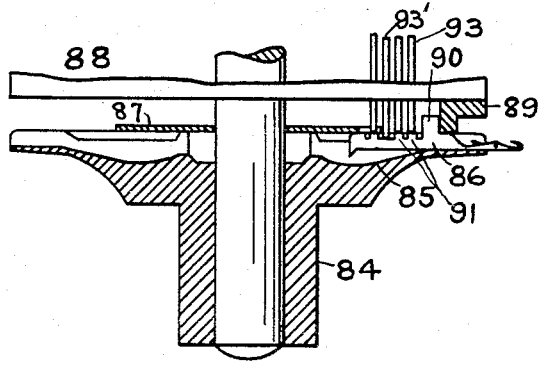
Fig. 25 is a sectional view showing a non-selected needle.

The needles such as 86 and 94 are maintained in their relatively horizontal position shown in Fig. 25, by friction between the side faces of the needles and the adjacent faces of the needle walls provided in the dial 84.

The fabric structure specifically disclosed in Fig. 2, consists of wales, such as wale 13, having some at least of their stitches spaced laterally or coursewise from the stitches of adjacent wales such as 9 and 10, a greater distance than the other and adjacent stitches of the other wales are spaced from each other. Furthermore, the fabric disclosed in Fig. 2, is a one and one knitted fabric, i. e., one plain wale, one rib wale, one plain wale, etc., (although the one and one arrangement is not essential) wherein at least some of the stitches in some of the wales, e. g. wales 15 and 16 are relatively loose or elongated as compared with the normally knitted stitches of the fabric.

When knitting plated work, i. e., with two threads or yarns, the loose stitches show as reversely plated areas although there is no actual reverse plating, the effect being due to the fact that the rib wales, being drawn in a direction opposite to that in which the plain wales are drawn, the plated relations of the threads show as being reversed in such rib wales when the said rib wales are viewed from the face side of the fabric; the same effect being shown on the inner face of the fabric at the plain wales.

Although the fabric method and mechanism have been described in specific terms, it is not the intention thereby to limit the appended claims otherwise than by the express limitations in the claims.

We claim:

1. A knitting machine consisting of two needle beds one of which is adapted to knit plain wales and the other of which is adapted to knit rib wales, means for selectively controlling the actuation of rib needles in such a manner that the selected rib needles are caused to draw longer stitches than the rib needles not selected.

2. In a knitting machine, a needle cylinder and needle dial for knitting rib fabric, said needle dial having needles mounted therein, some of which are positioned at a level above the level of adjacent dial needles to effect the knitting of stitches which are relatively loose as compared with adjacent stitches.

3. A dial and cylinder knitting machine adapted to knit rib fabric and having needles independently mounted in the dial and cylinder, and means for controlling the action of the cylinder needles in such a manner that loose stitches are drawn by such cylinder needles over the shanks of the companion dial needles, in combination with means for so controlling the dial needles as to cause the relatively loose stitches drawn by the cylinder needles as aforesaid, to be robbed therefrom by the dial needles.

4. In a rib knitting machine, a series of rib needles and a series of plain needles, each needle being independently actuated, and means for so controlling the rib needles as to cause relatively loose stitches to be drawn by the plain needles, the control of the rib needles consisting in causing the same to be tilted thereby raising the edges of the rib needles over which the plain stitches are drawn by the companion plain needles.

5. In a rib knitting machine, a series of rib needles and a series of plain needles, each needle being independently actuated, and means for selectively controlling the rib needles so as to cause relatively loose stitches to be drawn by the plain needles to produce varied or broken pattern effects.

6. In a rib knitting machine, a series of rib needles and a series of plain needles, each needle being independently actuated, means for selectively controlling the rib needles so as to cause relatively loose stitches to be drawn by the plain needles, the control of the rib needles consisting in causing the same to be tilted thereby raising the edges of the rib needles over which the plain stitches are drawn by the companion plain needles, and means for selectively raising such edges of the rib needles.

7. A cylinder and a dial for a rib knitting machine having needles independently mounted therein for sliding movements to and from thread taking position, means for selectively controlling the dial needles, the dial and dial needles being so constructed that when the needles are selectively actuated by the aforesaid means, the selected needles have imparted to them an additional retracting movement.

8. A knitting machine having a needle cylinder and a needle dial, cooperating needles in said cylinder and dial and cams through which said needles pass for drawing stitches of a rib fabric, portions of some of the dial needles, over which portions stitches are drawn by cooperating cylinder needles, being in a position relatively elevated above corresponding portions of other dial needles when the dial needles pass through the cams as the said cylinder needles draw stitches.

ROBERT H. LAWSON.
WILLIAM L. SMITH, Jr.